United States Patent
Sheu et al.

(10) Patent No.: US 9,077,403 B2
(45) Date of Patent: Jul. 7, 2015

(54) NETWORK MULTIPLE-INPUT MULTIPLE-OUTPUT WIRELESS SIGNAL TRANSMISSION AND POWER CONTROL SYSTEM

(71) Applicant: NATIONAL YUNLIN UNIVERSITY OF SCIENCE AND TECHNOLOGY, Douliu, Yunlin County (TW)

(72) Inventors: Jeng-Shin Sheu, Douliu (TW); Sin-Hong Lyu, Douliu (TW)

(73) Assignee: NATIONAL YUNLIN UNIVERSITY OF SCIENCE AND TECHNOLOGY, Douliu, Yunlin County (TW)

( * ) Notice: Subject to any disclaimer, the term of this patent is extended or adjusted under 35 U.S.C. 154(b) by 162 days.

(21) Appl. No.: 13/899,007

(22) Filed: May 21, 2013

(65) Prior Publication Data

US 2014/0349700 A1  Nov. 27, 2014

(51) Int. Cl.
*H04B 7/00* (2006.01)
*H04B 7/04* (2006.01)
*H04W 52/42* (2009.01)

(52) U.S. Cl.
CPC ............ *H04B 7/0426* (2013.01); *H04W 52/42* (2013.01)

(58) Field of Classification Search
None
See application file for complete search history.

(56) References Cited

U.S. PATENT DOCUMENTS

| | | | | |
|---|---|---|---|---|
| 2010/0272218 A1* | 10/2010 | Yeh et al. | | 375/330 |
| 2011/0205929 A1* | 8/2011 | Quek et al. | | 370/252 |
| 2011/0207487 A1* | 8/2011 | Yang et al. | | 455/507 |
| 2012/0115469 A1 | 5/2012 | Chen et al. | | |
| 2012/0150521 A1* | 6/2012 | Balkwill | | 703/13 |

* cited by examiner

*Primary Examiner* — Edward Urban
*Assistant Examiner* — Mohammed Rachedine
(74) *Attorney, Agent, or Firm* — Muncy, Geissler, Olds & Lowe, P.C.

(57) ABSTRACT

A network multiple-input multiple-output (MIMO) wireless signal transmission and power control system includes a plurality of adjacently arranged cells. Each cell is a regular polygon and includes a plurality of adjoining sides, a base station located at a center of the cell, a plurality of directional antennas equipped at the base station, and a power adjustment unit electrically connected to the directional antennas. The directional antennas point towards connection points of the adjoining sides, and sectorize the cell into a plurality of kite-shaped sections by regarding the directional antennas as centers. The power adjustment unit controls power output of the directional antennas. By changing pointing directions of the directional antennas, the cell can be sectorized into the kite-shaped sections to significantly increase system capacity and communication quality.

8 Claims, 9 Drawing Sheets

NETWORK MULTIPLE-INPUT MULTIPLE-OUTPUT WIRELESS SIGNAL TRANSMISSION AND POWER CONTROL SYSTEM

FIELD OF THE INVENTION

The present invention relates to a network multiple-input multiple-output (MIMO) wireless signal transmission system, and particularly to a network MIMO wireless signal transmission and power control system.

BACKGROUND OF THE INVENTION

To satisfy the demand for high data rate specified by fourth-generation (4G) mobile communications, two key techniques are adopted. One of the two key techniques is universal frequency reuse (UFR) for enhancing spectrum utilization efficiency of a system. The UFR technique however results in severe co-channel interference, which is most significant for cell edge users (CEUs). Therefore, the other technique, namely network multiple-input multiple-output (MIMO), is utilized for enhancing communication quality for CEUs. In two main 4G standard organizations, Long Term Evolution Advanced (LTE-A) and Worldwide Interoperability for Microwave Access (WiMAX), network MIMO is respectively referred to as coordinated multi-point (CoMP) and collaborative MIMO (Co-MIMO). An intention of the network MIMO is to combine multiple antenna signals by coordinating collaboration among multiple neighboring base stations, so as to solve the issue that CEUs are in long-term exposed to unsatisfactory communication quality under the universal frequency reuse technique. Thus, without increasing a bandwidth or a total transmission power, through signal processing of multiple antennas at transmission terminals and a reception terminal, spectrum efficiency of a wireless communication system can be remarkably enhanced to further increase the data rate and to improve communication quality. In a network MIMO system, each CELT has a corresponding cooperative cell set (CCS), and is collaboratively serviced by all base stations within the corresponding CCS.

The US publication No. 2012115469 discloses method for user equipment (UE) indication and measurement for interference coordination. Through the UE, limited radio resources are confirmed and it is not necessary to receive a precise measurement configuration. Further, through the UE, interference statuses and/or additional interference information of the UE may be reported to a corresponding base station to reinforce interference coordination. In addition, measurement results of the UE may also be utilized for scheduling, RLM and mobility management to further optimize radio spectrum performance as well as to improve user experiences.

In an MIMO network, in order to reduce interference between cells and to enhance CEU performance through collaborative transmission between multiple cells, the research interest in MIMO networks and inter-cell interference coordination (ICIC) such as fractional frequency reuse (FFR) in cellular mobile communication systems continues to grow. The study of ICIC strategies on top of network MIMO systems has drawn increasing interest, where cells are divided into sectors for efficiently managing radio resource and mitigating inter-cell interference. However, these results were proposed without proper analysis on a close relationship between cell sectorization and a system capacity. FIG. 1 shows a conventional sectorization method, In FIG. 1, a central coverage area 1 neighboring to a center 3 and an edge coverage area 2 farther from the center 3 are depicted. As the central coverage area 1 is closer to the center 3, a user in the central coverage area 1 is given better wireless signal transmission and reception quality, whereas a user at the edge coverage area 2 farther away from the center 3 receives weaker wireless signals and also suffers from severer inter-cell interference. A directional antenna 4 associated with a sector points to a central position of a border 5, and so a coverage area of each directional antenna 4 forms a triangular shape in a hexagonal cell. Signals transmitted along a direction pointed by each of the directional antennas 4 have the strongest strength, whereas signals transmitted along other angles towards two sides of the directional antenna 4 are gradually weakened. Referring to FIG. 2 showing a curve 6 of antenna gain, when the direction of the directional antenna 4 is a reference angle (0 degree), the coverage area of the directional antenna 4 is 0 to −30 degrees extended to the left and 0 to +30 degrees extended to the right. Note that a user is located closer to the angle of 0 degree (the direction pointed by the directional antenna 4), better signals are obtained. As the location of the user is getting towards the two sides of the directional antenna 4, signals are gradually weakened, thus damaging the signal quality of wireless transmission. A conventional hexagonal cell is sectorized into triangles for 60-degree sectorization. Referring to a particular edge coverage area 2 in FIG. 1, a height of a particular bar 7 in FIG. 2 represents an edge area to a particular corresponding one angle span. In other words, as a deflection angle from the directional antenna 4 gets larger, the area occupied by the corresponding bar 7 in the edge coverage area 2 of the triangle becomes greater. Further, as observed from FIG. 2, the bars 7 are inversely proportional to the antenna strength curve 6. That is, as an included angle of the directional antenna 4 gets larger, a corresponding edge area ratio occupied also becomes larger. Thus, the edge area of a sector is mainly distributed in regions far away from the direction giving the maximum antenna gain. In general, users are uniformly distributed in a cell. For the conventional sectorization method, it follows that most CEUs are located in regions with less transmitted antenna gains, which unfortunately cause that most user signals transmitted are weakened due to their corresponding smaller antenna gains.

Also, referring to FIG. 3, in the conventional cell sectorization, a CCS corresponding to a CEU 8 located at the edge coverage area 2 only includes two neighboring collaborative base stations (one its own home base station and one neighboring base station). Each of the two base stations has a directional antenna exactly pointing towards each other. Thus, a CEU located in the edge coverage area 2 is provided with only one additional neighboring cell for signal connection and data transmission. Further, the CEU also receives a greater interference strength that further degrades transmission quality.

SUMMARY OF THE INVENTION

Therefore the primary object of the present invention is to overcome issues of low signal strength as well as unsatisfactory data rate and signal quality at an edge coverage area in wireless communication.

To achieve the above object, a network multiple-input multiple-output (MIMO) wireless signal transmission and power control system is provided. The network MIMO wireless signal transmission and power control system is a multi-cellular system, which comprises a plurality of adjacently arranged cells. Each of the cells is a regular polygon, and comprises a plurality of adjoining sides, a base station located at a center of the cell, a plurality of directional antennas equipped at the base station, and a power adjustment unit electrically connected to the directional antennas. The directional antennas point towards connection points of the adjoining sides, and sectorize the cell into a plurality of kite-shaped sections by regarding the directional antennas as centers. The power adjustment unit controls power output of the directional antennas.

It is known from the above descriptions that, in the present invention, by changing pointing directions of the directional antennas, the cell is sectorized into kite-shaped sections, thereby the CEUs can be offered with better wireless signals.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 4:
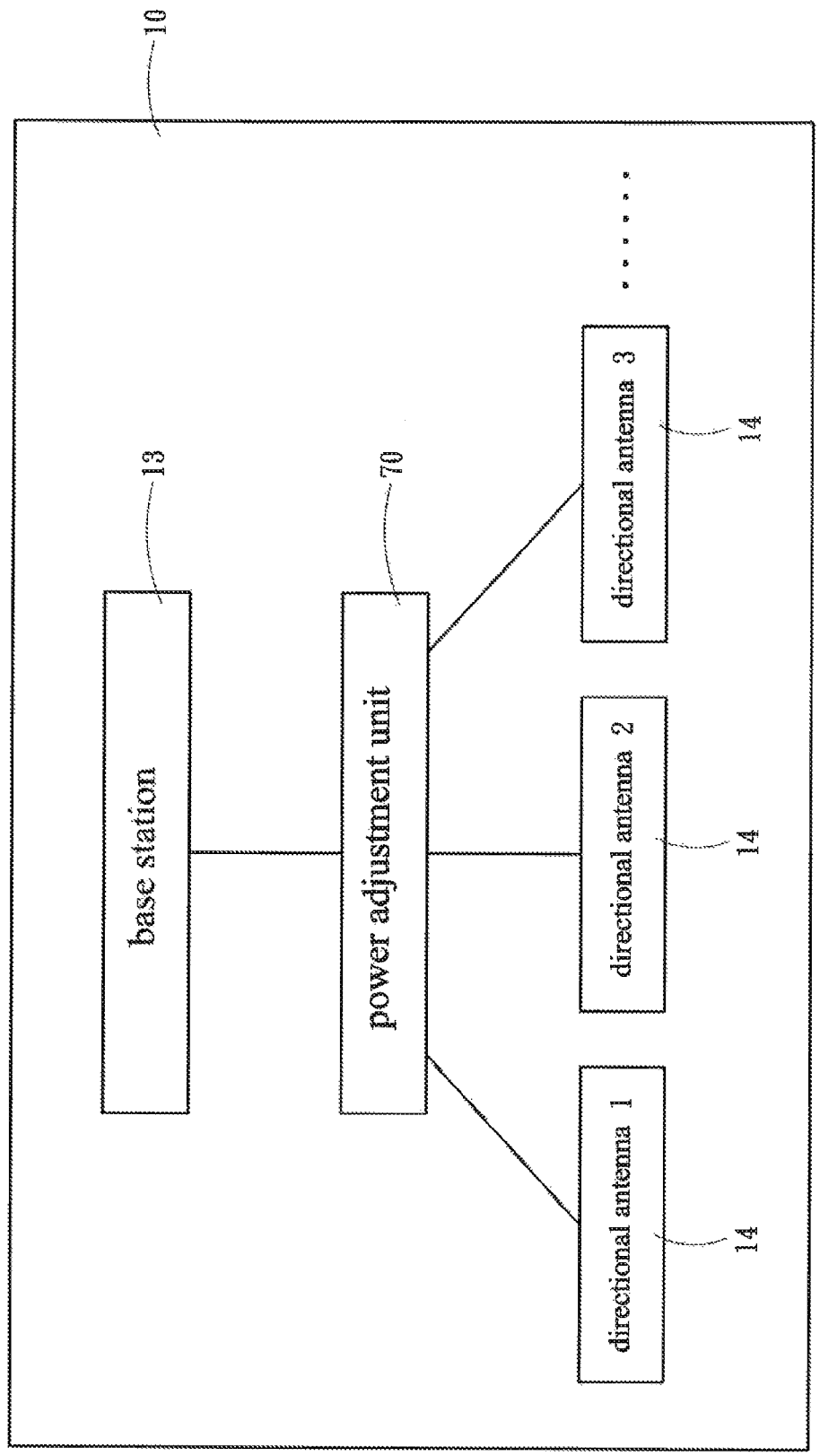
FIG. 4 is a block diagram of the present invention.
Figure 5:
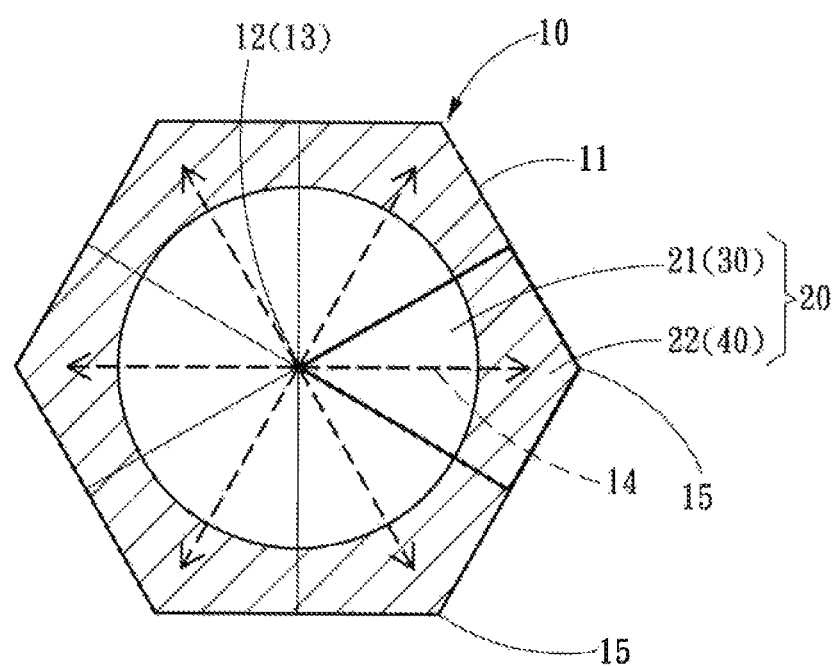
FIG. 5 is a schematic diagram of a cell of the present invention.

Referring to FIGS. 4 and 5, a network multiple-input multiple-output (MIMO) wireless transmission and power control system comprises a plurality of adjacently arranged cells 10. Each of the cells 10, being a regular polygon, comprises a plurality of adjoining sides 11, a base station 13 located at a center 12 of the cell 10, a plurality of directional antennas 14 equipped at the base station 13, and a power adjustment unit 70 electrically connected to the directional antennas 14. The directional antennas 14 point towards connection points of the adjoining sides 15, and sectorize the cell 10 into a plurality of kite-shaped sections 20 by regarding the directional antennas 14 as centers. The power adjustment unit 70 controls power output of the directional antennas 14. Each of the kite-shaped sections 20 comprises a central coverage area 21 adjacent to the center 12, and an edge coverage area 22 adjacent to the corresponding adjoining sides 11. In the embodiment, each of the cells 10 is a regular hexagon, and the central coverage areas 21 of the kite-shaped sections 20 surround the center 12 to form a circular coverage area, which jointly forms the regular hexagonal cell shape with the edge coverage areas 22.

Figure 6A:
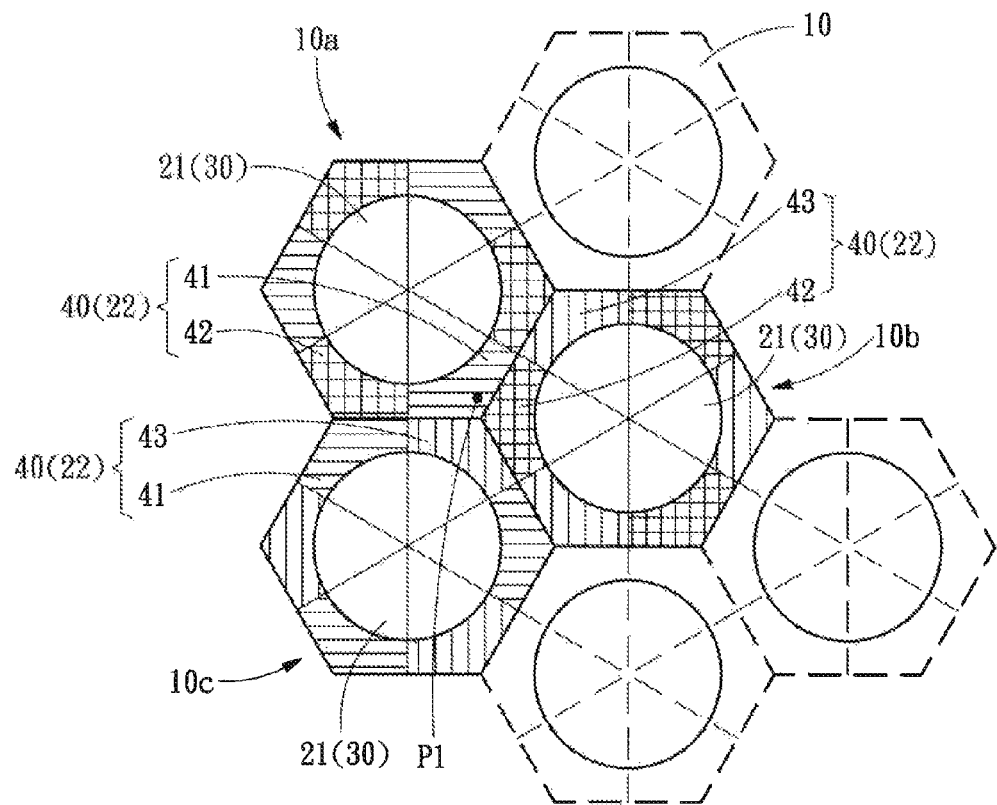
FIG. 6A is a schematic diagram depicting spectrum utilization in a cell system of the present invention.
Figure 6B:
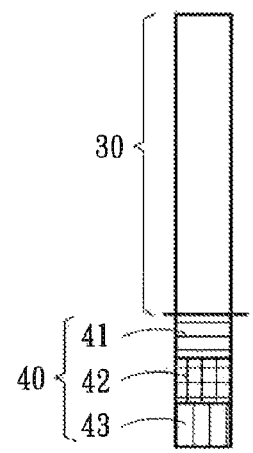
FIG. 6B is a schematic diagram depicting frequency division of the present invention.

Referring to FIG. 6A, in order to prevent inter-cell interference and to enhance signal transmission/reception quality, as well as to offer users at edge areas between the cells 10 with better communication quality, a configuration for spectrum utilization is provided by the disclosure. A base station 13 transmits over an inner area frequency band 30 and at least two outer area frequency bands 40. As shown in FIG. 6B, a frequency range of the inner area frequency band 30 is non-overlapping with those of the outer area frequency bands 40. The inner area frequency band 30 is for use of users located in the central coverage area 21, and the outer area frequency bands 40 are for use of users located in the edge coverage area 22. In an alternative embodiment, instead of two outer area frequency bands 40, the number of the outer area frequency bands 40 may be correspondingly arranged according to configurations and shapes of the cells 10. In the embodiment, a plurality of cells 10 are connected to one another to form a cellular structure. For illustrations, any three adjacently arranged cells 10 are defined as a first cell 10a, a second cell 10b and a third cell 10c, as shown in FIG. 6A. Each of the cells 10 transmits over the inner area frequency band 30 and two outer area frequency bands 40.

Referring to FIG. 6B, due to a limited distance from the base station 13 to users located in the central coverage area 21, the cells 10 may utilize the same inner area frequency band 30 without interfering one another. Regarding the outer area frequency bands 40, the base station 13 of the first cell 10a in FIG. 6A transmits over a first outer area frequency band 41 and a second outer area frequency band 42; the base station 13 of the second cell 10b transmits over the second outer area frequency band 42 and a third outer area frequency band 43; the base station 13 of the third cell 10c transmits over the first outer area frequency band 41 and the third outer area frequency band 43. In the first cell 10a, the first outer area frequency band 41 and the second outer area frequency band 42 respectively correspond to three kite-shaped sections 20, and are alternately arranged. In the second cell 10b, the second outer area frequency band 42 and the third outer area frequency band 43 respectively correspond to three kite-shaped sections 20, and are alternately arranged. In the third cell 10c, the first outer area frequency band 41 and the third outer area frequency band 43 respectively correspond to three kite-shaped sections 20, and are alternately arranged.

Referring to FIG. 6A, the adjacent kite-shaped sections 20 of the first cell 10a, the second cell 10b and the third cell 10c utilize different frequency ranges of the outer area frequency bands 40 to serve their own CEUs within respective cell coverage. In addition to serving one CEU by a designated outer area frequency band of the home cell where the CEU is located, the CEU is also served collaboratively by two additional adjacent cells using the same outer area frequency band. As previous stated, in a network MIMO system, each CEU has a corresponding CCS, and is served by all base stations in the CCS. For example, referring to FIG. 6A, for a CEU located at an edge position P1 of the first cell 10a, the CCS of the user includes the cells 10a, 10b and 10c. The corresponding kite-shaped section 20 of the user at P1 in the first cell 10a utilizes the first outer area frequency band 41. Meanwhile, the adjacent second cell 10b and third cell 10c utilize the same first outer area frequency band 41 to collaboratively serve the CEU in the first cell 10a. Since transmission channel conditions of the base stations 13 are independent, the CEU is given higher transmission macro diversity when it is collaboratively served by the three cells 10a, 10b and 10c in the CCS. The advantage of high transmission macro diversity helps in solving the issue of low signal strength at the edge coverage area in wireless transmission. Recall that the order of transmission macro diversity is only two (that is, the size of CCS is two) for the conventional cell sectorization (referring to FIG. 3). Further, as the adjacent first cell 10a, second cell 10b and third cell 10c respectively utilize the first outer area frequency band 41, the second outer area frequency band 42 and the third outer area frequency band 43 with different frequency ranges, signal transmission between the corresponding CEUs is free from mutual interference, thereby effectively overcoming the issue of signal interference caused by frequency overlapping.

Regarding power control, a specific power and a number of users for the central coverage area 21 are respectively defined as Pc and x, and a specific power and a number of users for the edge coverage area 22 are respectively defined as Pe and y. Since the CEU in each edge coverage area 22 has a corresponding CCS, the CCS includes the base station 13 corresponding to the CEU and two additional adjacent base stations 13 that collaboratively serve the CEU. Therefore, for one specific cell 10, the users it serves not only include users located within its own coverage, but also may simultaneously include other CEUs located in the edge coverage areas 22 of other adjacent cells 10. Therefore, for one cell 10, its served CEUs located at the adjacent edge coverage areas 22 of other adjacent cells also need to be considered for power control. In the present invention, for one cell 10, a specific power and a number of served CEUs associated with the edge coverage areas 22 of other adjacent cells are respectively defined as Pe' and z. It is defined that Pta=xPc+yPe+zPe', where Pta is the total transmission power emitted from a directional antenna and zPe' is the power consumption for serving the CEUs at the edge coverage areas of other adjacent cells. For one cell 10, it is obvious that the more power (zPe') the inter-cell CEUs consume; the less power its own intra-cell users can use. Thus, it is also defined that K=zPe'/Pta. When K is greater than an outer area threshold coefficient Kmax, the power adjustment unit 70 is controlled to reduce the total power required by the CEUs at the edge coverage areas of other adjacent cells. In the embodiment, when K is greater than the outer area threshold coefficient Kmax, a reduction coefficient may be defined as:

$$\rho 1 = \frac{K\max}{1 - K\max} \times \frac{(xPc \cdot yPe)}{XPe\prime}.$$

When K does not exceed the outer area threshold coefficient Kmax, it is defined that ρ1=1. Thus, the power adjustment unit 70 controls the specific power Pe' to ρ1*Pe', thereby effectively controlling the total power required for serving the CEUs at the edges of adjacent cells without affecting the power allocated to the intra-cell users within the central coverage area 21 and the edge coverage area 22.

In addition, when the overall power required Pta is greater than a maximum threshold power Pmax, the power adjustment unit 70 is controlled to reduce the power of Pc, Pe and Pe' using equal proportions. In the embodiment, when Pta exceeds the maximum threshold power, it is defined that $$\rho 2 = \frac{P\max}{Pta},$$

or else it is defined that ρ2=1. Therefore, the power adjustment unit 70 controls the specific power of the central coverage area 21, the specific power within the edge coverage area 22 and the specific power outside the edge coverage area 22 to be ρ2*Pc, ρ2*Pe and ρ2*(ρ1*Pe'), respectively, so as to stabilize the output power of the base station 13.

Figure 1:
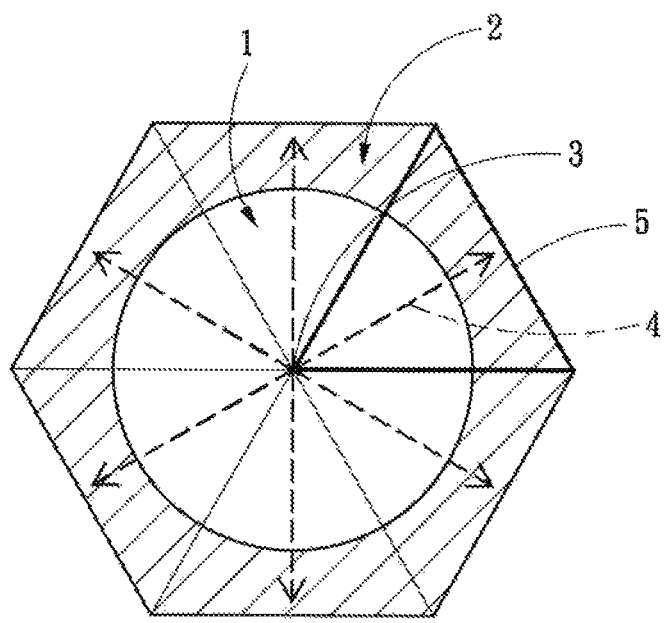
FIG. 1 is a schematic diagram of a cell structure in the prior art.
Figure 2:
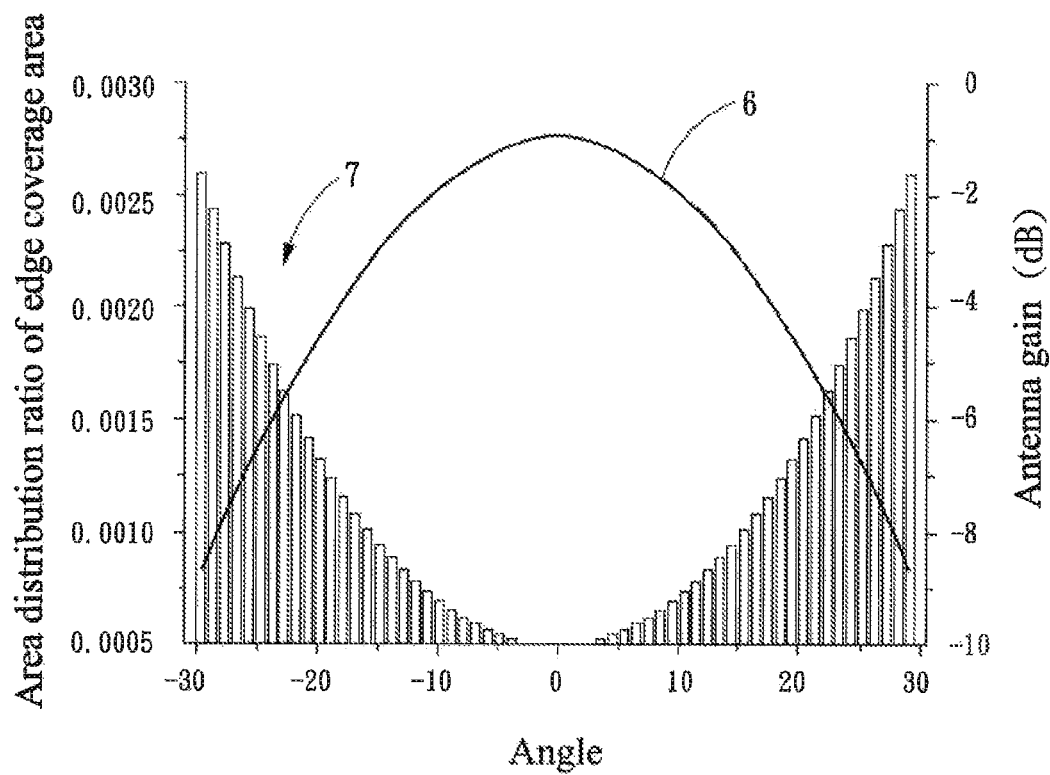
FIG. 2 is a schematic diagram of a relationship between an antenna gain and a position in the prior art.
Figure 3:
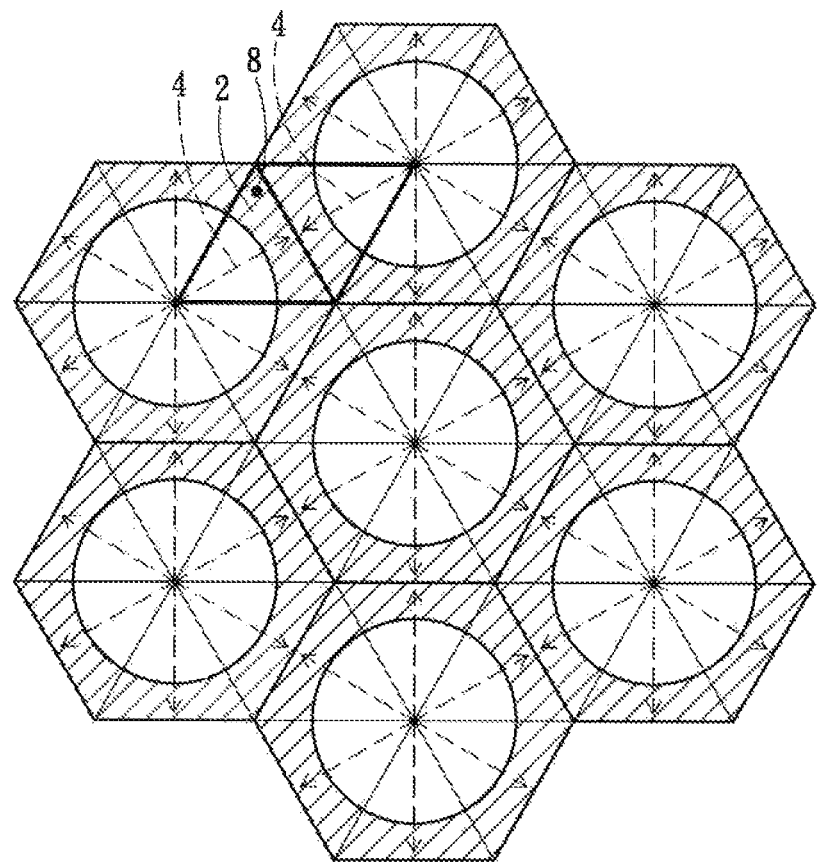
FIG. 3 is a schematic diagram of a cell system range in the prior art.
Figure 7:
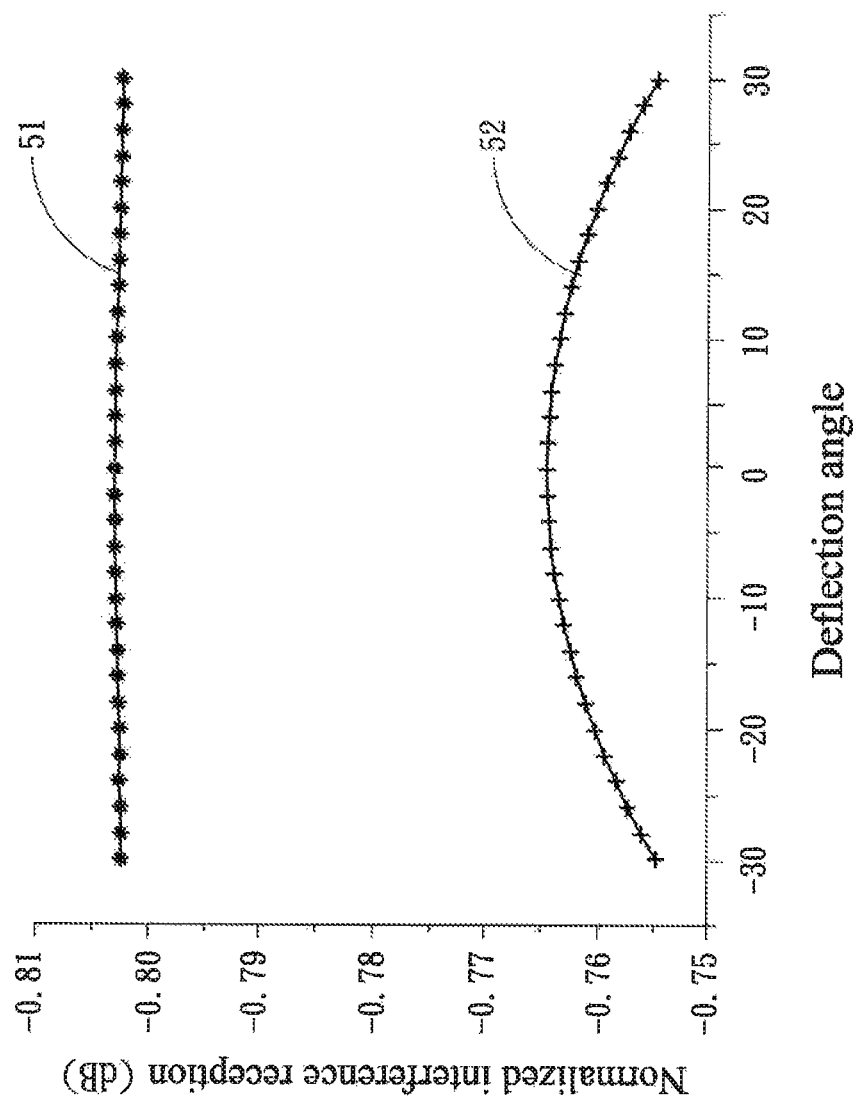
FIG. 7 is a comparison diagram of signal interference.

FIG. 7 shows an interference reception curve 51 of a conventional technique and an interference reception curve 52 of the present invention, observed in edge coverage area 2 and 22, respectively. In the conventional technique, a deflection angle is an angle included by a connection line between a user and the center 3 and the directional antenna 4. In the present invention, a deflection angle is an angle included by a connection line between a user and the center 12 and the directional antenna 14. As shown in FIGS. 1 and 3, in the prior art, the interference reception curve 51 results from a triangular-shaped edge coverage area formed by having the directional antennas 4 of two adjacent base stations of a CCS exactly point towards each other. As shown in FIGS. 5 and 6A, the interference reception curve 52 results from a kite-shaped edge coverage area formed by relatively changing the pointing directions of directional antennas such that the size of a CCS is increased to three. As shown in FIG. 7, comparing the interference reception curves, the interference strength received by the kite-shaped section (interference reception curve 52) is lower than that received by the conventional triangular-shaped section (interference reception curve 51). This indicates that the kite-shaped section interference reception curve 52 has better anti-interference capability.

Figure 8:
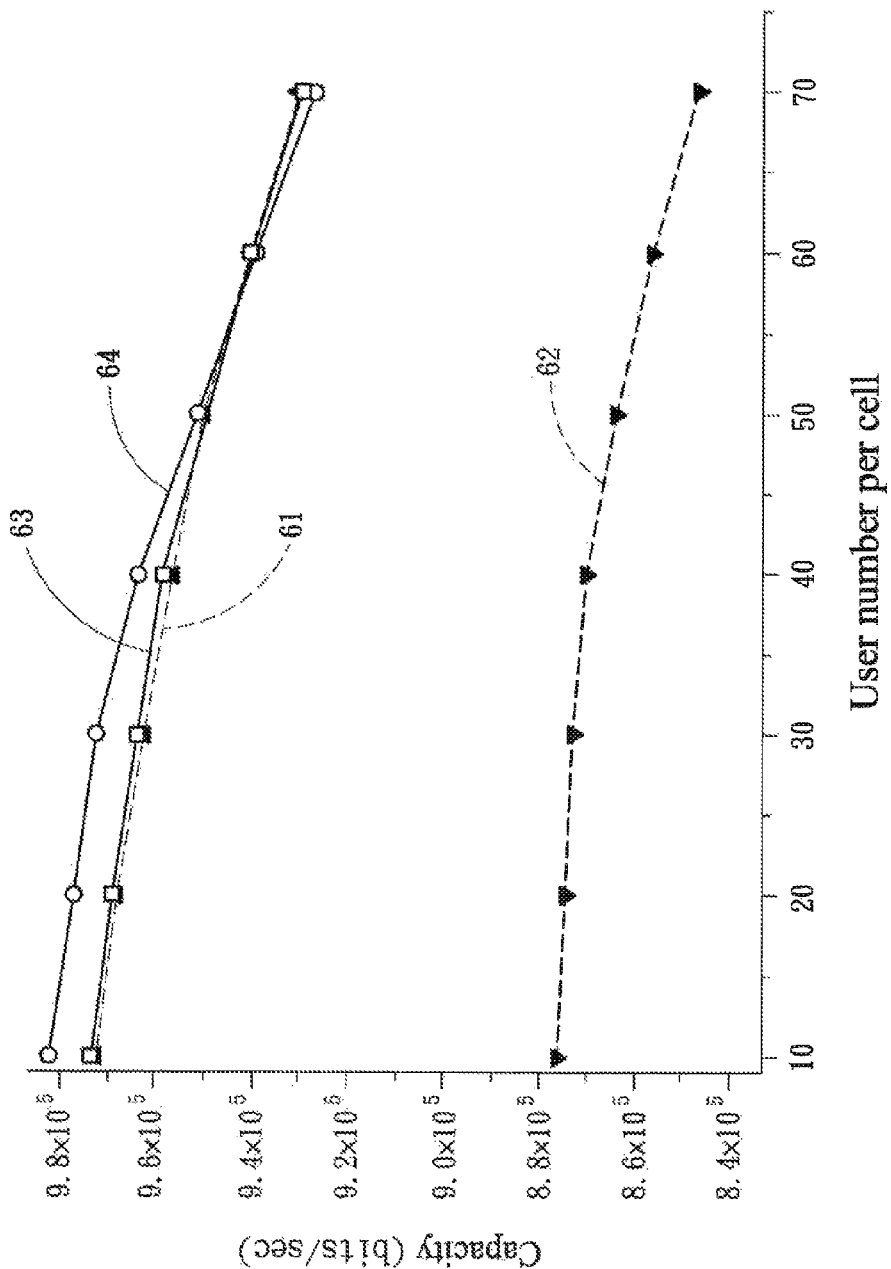
FIG. 8 is a comparison diagram of signal capacities.

FIG. 8 shows a schematic diagram comparing capacities in terms of numbers of users. Referring to FIGS. 1 and 3 showing the prior art, in the conventional technique, it is apparent that performance of a curve 61 at the central coverage area 1 is noticeably better than that of the curve 62 at the edge coverage area 2. More specifically, the better performance of the curve 61 results from the stronger signal reception at the central coverage area 1. In contrast, as the signals received at the edge coverage area 2 are far from that received at the center 3 and also susceptibly interfered by signals of co-channel cells 10, their quality and strength are significantly lower than those of the curve 61 of central coverage area. Referring to FIGS. 6A and 8, for the present invention, its performance curve 63 at the central coverage area 21 is similar to the central-coverage curve 61 of the conventional technique. Since both are located close to the base station at the center, no noticeable performance differences are observed. However, the performance of a curve 64 at the edge coverage area 22 of the present invention is remarkably better than the curve 62 at the edge coverage area 2 of the conventional technique. A main reason for the improved performance is that, with the design of the kite-shaped sections 20, the size of CCS is increased as compared with the conventional one. As shown in FIG. 6A, it is found that a CEU located at the edge coverage area 22 is offered with more options of performing signal connection from two additional adjacent collaborative cells 10 and thus provided more signal source selections. Further, as shown in FIG. 7, with the kite-shaped sections 20 of the present invention, the interference strength received is lower than that received by the conventional triangular design. Thus, in FIG. 8, the performance curve 64 of a CEU located at the edge coverage area 22 is remarkably better than that curve 62 of a CEU located at the conventional edge coverage area.

Figure 9:
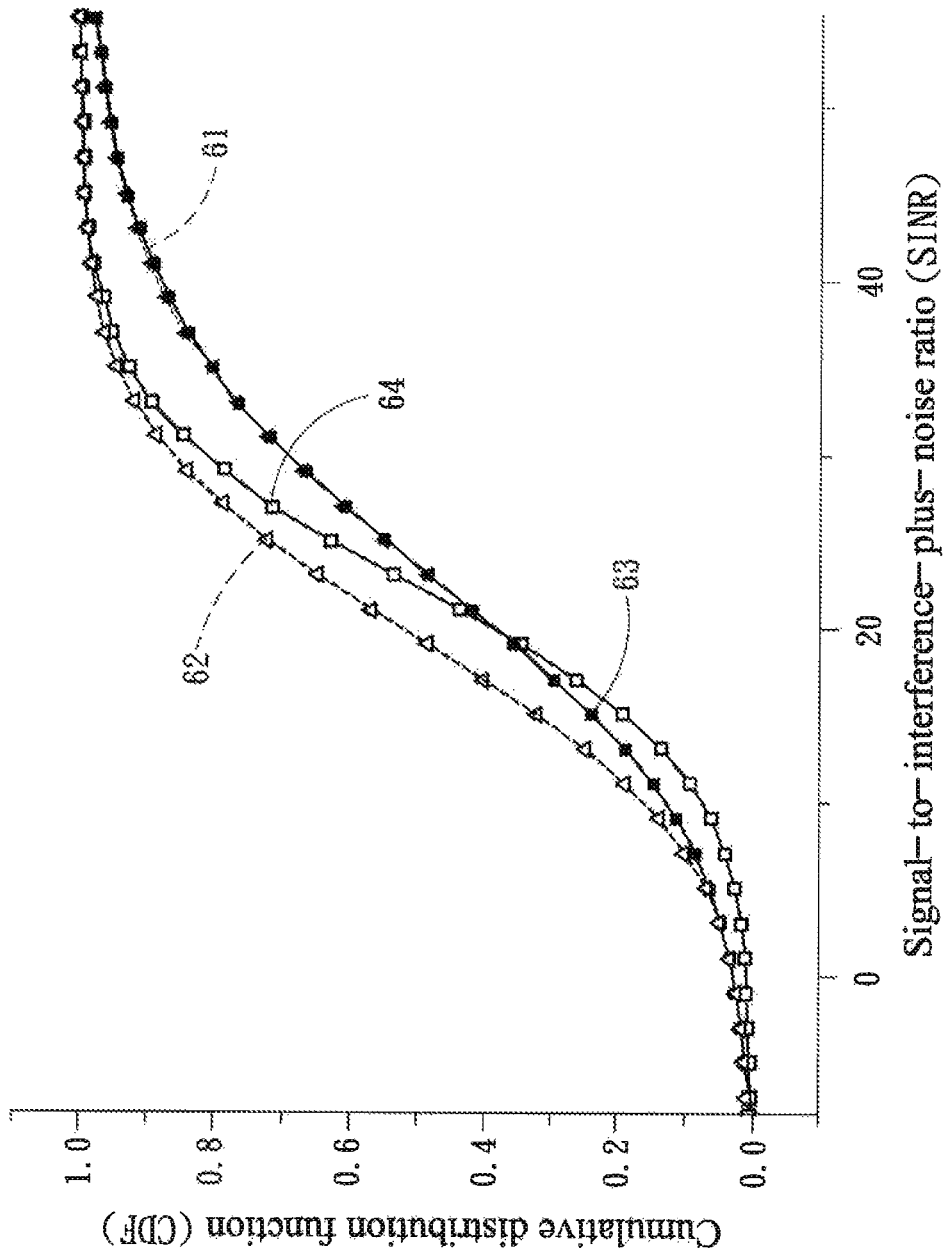
FIG. 9 is a comparison diagram of cumulative distribution functions.

FIG. 9 shows a diagram of cumulative distribution functions (CDFs). Similarly, the performance of the kite-shaped section central coverage curve 63 is similar to that of the triangular central coverage curve 61. With the same value of CDFs, the kite-shaped section edge coverage curve 64 of the edge coverage area 22 is superior to the triangular edge coverage curve 62. That is to say, under the same CDF value, a high signal-to-interference-plus-noise ratio (SINR) is obtained by the kite-shaped section edge coverage curve 64 of the present invention.

In conclusion, the present invention offers the advantages below. First of all, the cell is sectorized into a plurality of kite-shaped sections by changing the pointing directions of the directional antennas; thereby the CEUs can be offered with better wireless signals.

Secondly, one CEU at the edge coverage area of any cell is allowed to receive signals of outer area frequency bands from two additional collaborative adjacent cells. Thus, a CEU is to provided with more options for signal connection and data transmission to enhance signal quality and signal strength.

What is claimed is:

1. A network multiple-input multiple-output (MIMO) wireless signal transmission and power control system, comprising:
   a plurality of adjacently arranged cells, each being a regular polygon and comprising:
      a plurality of adjoining sides;
      a base station, located at a center of the cell;
      a plurality of directional antennas, equipped at the base station; and
      a power adjustment unit, electrically connected to the directional antennas;
   wherein, the directional antennas point towards connection points of the adjoining sides, and sectorize the cell into a plurality of kite-shaped sections by regarding the directional antennas as centers, and the power adjustment unit is for controlling power output of the directional antennas,
   wherein each of the kite-shaped sections comprises a central coverage area adjacent to the center of the cell and an edge coverage area adjacent to the adjoining sides of the cell, and
   wherein a specific power and a user number of the central coverage area are respectively defined as Pc and x, a specific power and a user number of the edge coverage area are respectively defined as Pe and y, and a specific power and a user number outside the edge coverage area of other collaborative adjacent cells are respectively defined as Pe' and z; it is defined that Pta =xPc+yPe+ zPe', and K =zPe'/Pta; when K is greater than an outer area threshold coefficient Kmax, the power adjustment unit is applied to reduce the specific power outside the edge coverage area.

2. The network MIMO wireless signal transmission and power control system of claim 1, wherein the base station transmits using an inner area frequency band and at least two outer area frequency bands, frequency ranges of the inner area frequency band and the at least two outer area frequency bands are non-overlapping, the inner area frequency band is for use of users within the central coverage area, and the at least two outer area frequency bands are for use of users within the edge coverage area.

3. The network MIMO wireless signal transmission and power control system of claim 1, wherein the power adjustment unit is controlled to reduce the specific power outside the edge coverage area to $\rho 1 * Pe'$, where $$\rho 1 = \frac{K\max}{1 - K\max} \times \frac{(xPc \cdot yPe)}{XPe'}.$$

4. The network MIMO wireless signal transmission and power control system of claim 1, wherein when Pta is greater than a maximum threshold power Pmax, the power adjustment unit is controlled to reduce powers Pc, Pe and Pe' by an equal proportion.

5. The network MIMO wireless signal transmission and power control system of claim 4, wherein the power adjustment unit is controlled to reduce the powers Pc, Pe and Pe' by the equal proportion to $\rho 2*Pc$, $\rho 2*Pe$ and $\rho 2(\rho 1*Pe')$ respectively, where $$\rho 2 = \frac{P\max}{Pta}.$$

6. The network MIMO wireless signal transmission and power control system of claim 2, wherein each of the cells is a regular hexagon, any three adjacently arranged cells are respectively defined as a first cell, a second cell and a third cell; the base station of the first cell transmits over a first outer area frequency band and a second outer area frequency band, the base station of the second cell transmits over the second outer area frequency band and a third outer area frequency band, and the base station of the third cell transmits over the first outer area frequency band and the third outer area frequency band.

7. The network MIMO wireless signal transmission and power control system of claim 4, wherein in the first cell, the first outer area frequency band and the second outer area frequency band respectively correspond to three kite-shaped sections, and are alternately arranged; in the second cell, the second outer area frequency band and the third outer area frequency band respectively correspond to three kite-shaped sections, and are alternately arranged; in the third cell, the first outer area frequency band and the third outer area frequency band respectively correspond to three kite-shaped sections, and are alternately arranged.

8. The network MIMO wireless signal transmission and power control system of claim 5, wherein the adjacent kite-shaped sections of the first cell, the second cell and the third cell transmit at the outer area frequency bands having different frequency ranges.

* * * * *